Figure 1:
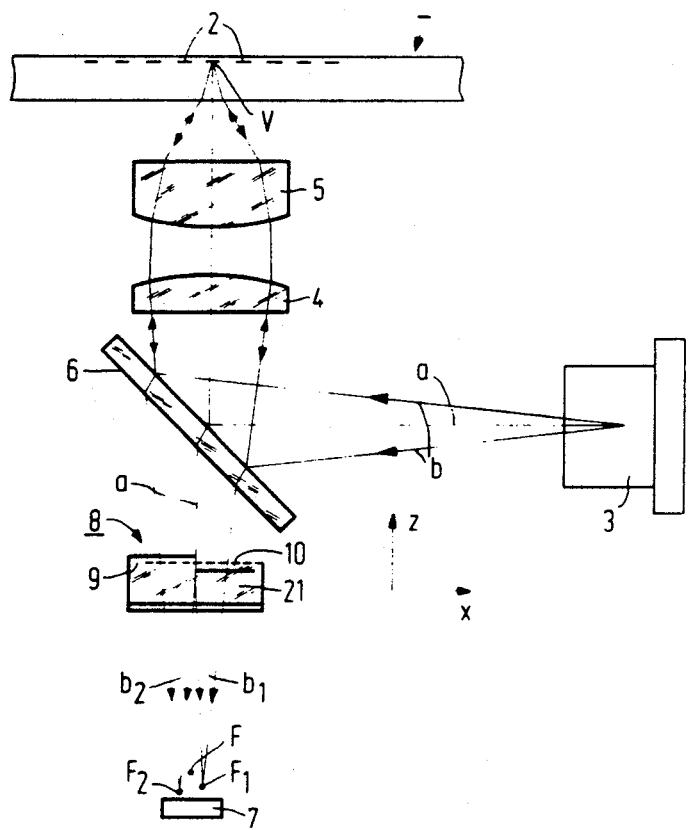

United States Patent [19]

Smid et al.

[11] Patent Number: 4,712,205
[45] Date of Patent: Dec. 8, 1987

[54] OPTO-ELECTRONIC FOCUSSING-ERROR DETECTION SYSTEM WITH A COMPOUND WEDGE BEAM SPLITTER

[75] Inventors: Albert Smid; Peter F. Greve; Hendrik 't Lam, all of Eindhoven, Netherlands

[73] Assignee: U.S. Philips Corporation, New York, N.Y.

[21] Appl. No.: 682,226

[22] Filed: Dec. 17, 1984

[30] Foreign Application Priority Data

Oct. 5, 1984 [NL] Netherlands .................. 8403034

[51] Int. Cl.[4] ................................................ G11B 7/00
[52] U.S. Cl. .............................. 369/45; 369/46; 369/112; 250/201
[58] Field of Search .............. 369/45, 46, 110, 112; 350/170, 286; 250/201 AF, 201 DF

[56] References Cited

U.S. PATENT DOCUMENTS

| 4,003,637 | 1/1977 | Masuoka | 350/286 |
|---|---|---|---|
| 4,143,402 | 3/1979 | Bricot et al. | 369/45 |
| 4,450,547 | 5/1984 | Nakamura et al. | 369/45 |
| 4,453,241 | 6/1984 | van de Veerdonk et al. | 369/112 |
| 4,489,408 | 12/1984 | Verhoeven et al. | 369/112 |
| 4,533,826 | 8/1985 | van Alem | 369/45 X |
| 4,561,081 | 12/1985 | Janssen et al. | 369/45 |

*Primary Examiner*—Aristotelis M. Psitos
*Attorney, Agent, or Firm*—Robert T. Mayer; Algy Tamoshunas

[57] ABSTRACT

An opto-electronic focussing-error detection system is described for detecting a deviation between a radiation-reflecting surface and a plane of focussing of an objective system in an optical imaging system. The detection system comprises a beam-splitting element and a radiation-sensitive detection system arranged behind the beam-splitting element and two groups of detectors. The first group is associated with a first sub-beam and the second group with a second sub-beam of two sub-beams formed by the beam-splitting element. The beam-splitting element is a compound wedge comprising two wedge sections having a common base surface and each having an upper surface situated opposite the base surface. The upper surfaces are inclined relative to each other in the plane of the interface between the two wedge sections with that plane extending substantially perpendicularly to the base surface and to the upper surfaces and containing the optical axis of the imaging system. The two groups of detectors are each situated one side of a plane containing the optical axis and extend substantially perpendicularly to the interface.

17 Claims, 5 Drawing Figures

OPTO-ELECTRONIC FOCUSSING-ERROR DETECTION SYSTEM WITH A COMPOUND WEDGE BEAM SPLITTER

The invention relates to an opto-electronic focussing-error detection system for detecting, in an optical imaging system, a deviation between a radiation-reflecting surface and a focussing plane of an objective system. In particular the invention is applicable to an apparatus for reading a record carrier having an optical radiation-reflecting information structure or an apparatus for optically recording information in a record carrier. Such a focussing-error detection system comprises a beam-splitting element arranged in the path of a radiation beam which has been reflected by the reflecting surface and a radiation-sensitive detection system arranged behind the beam-splitting element and comprising a plurality of detectors arranged in two groups. The first of the two groups is associated with a first sub-beam and the second group with a second sub-beam of two sub-beams formed by the beam-splitting element. The outputs of the detectors are connected to the inputs of an electronic circuit which derives a focussing-error signal from the detector signals.

Such a system is known, inter alia from Netherlands Patent Application No. 81 04588 corresponding to U.S. Pat. No. 4,489,408. The system described therein comprises a radiation source in the form of a semiconductor diode laser. An objective system focusses the read beam emitted by this laser onto an information structure on a disc-shaped record carrier. The read beam which has been reflected by the information structure traverses the objective system a second time and subsequently it passes through a beam-dividing prism arranged between the radiation source and the objective system. This prism diverts the modulated read beam from the radiation path of the beam which has been emitted by the source, so that the modulated beam can be received by a radiation-sensitive detection system which supplies an electric signal in conformity with the modulation of the latter beam.

In optical systems which are used for imaging very minute information details and which have a large numerical aperture, the depth of focus is small. Imaging systems of this type are employed, for example, in microscopes, or in apparatus for reading an optical record carrier with very small details, or in apparatus for recording information in a record carrier. In such systems is essential that a deviation between the actual and the desired plane of focussing can be detected so as to enable the focussing to be corrected accordingly. For this purpose, as described in the afore-mentioned U.S. Pat. No. 4,489,408, a roof prism may be arranged on the exit surface of the beam dividing prism. The roof prism splits the beam into two sub-beams which are incident on two separate detectors of the radiation-sensitive detection system. This system comprises, for example, four radiation-sensitive detectors arranged along a line transverse to the refractive edge of the roof prism. Subtracting the sum of the signals from the two inner detectors from the sum of the signals from the two outer detectors yields a signal which is proportional to a focussing error.

In practice it may be desirable to separate the beam-splitting element from the beam-dividing element, for example if for reasons of cost an element other than the prism is to be used for beam-dividing. This other element may be, for example, a semitransparent mirror. The beam-splitting element, which should be arranged in the radiation path between the beam-dividing element and the detection system, may comprise a wedge-shaped element having the same shape as the roof prism. This wedge-shaped element may be made of cheap plastic and can be manufactured cheaply using the customary moulding techniques. However, such an element is sensitive to environmental influences such as temperature. A temperature variation causes the refractive index and the shape of the element to change so that the sub-beams and, hence, the radiation spots formed by these sub-beams in the plane of the radiation-sensitive detection system are shifted relative to the associated detectors. In the case of the beam-splitting element and detector arrangement described in U.S. Pat. No. 4,489,408 this shift would be in the same direction as the shift caused by focussing errors. The shift of the radiation spots caused by the temperature variation is then interpreted as a focussing error, so that the focussing servo-system is responsive to an incorrect focussing-error signal and a correct focussing is not possible.

The present invention aims at providing a focussing-error detection system comprising a beam-splitting element which substantially eliminates environmental influences on the focussing-error signal. According to the invention, the system is characterized in that the beam-splitting element is a compound wedge comprising two wedge sections having a common base surface. Each wedge section has an upper surface situated opposite the base surface, which upper surfaces are inclined relative to each other in the plane of the interface between the two wedge sections. The plane of said interface extends substantially perpendicularly to the base surface and to the upper surfaces and contain the optical axis of the imaging system. The two groups of detectors are each situated on one side of a plane containing the optical axis and extend substantially perpendicularly to the interface.

In this focussing-error detection system a variation of, for example, the ambient temperature gives rise to a shift of a radiation spot in the longitudinal direction of the strip separating the detector in one group. This shift hardly affects the difference between the output signals of the detectors of a group and consequently does not give rise to an erroneous focussing-error signal.

The invention may also be employed in a focussing-error detection system in which the beam-splitting element is a roof prism arranged on the beam-dividing element in the form of, for example, a prism. The optical behaviour of such a roof prism will also depend on, for example, the ambient temperature if the prism is not, as in the system in accordance with U.S. Pat. No. 4,489,408, made of a thin layer of a polymerisable plastic in which changes in the refractive index and shape as a result of a temperature variation substantially compensate for each other.

As already stated, if the beam-splitting element and the beam-dividing element are separated from each other, the latter may be an element other than a prism. For reasons of cost it is preferred to use a semitransparent mirror as beam-dividing element. For a convergent beam which traverses the mirror, the mirror constitutes a plane-parallel plate which may give rise to astigmatism because of its oblique position in the beam. In order to mitigate this problem, a preferred embodiment of the invention is characterized further in that the compound wedge is arranged on a surface of a cylindrical lens. The cylindrical lens can correct the astigmatism introduced by the plane-parallel plate.

Preferably, the compound wedge and the cylindrical lens are made of the same material and constitute one integrated optical element. This element can be manufactured cheaply using the customary moulding techniques.

Preferably, the strip separating the detectors of the first group extends at a first small angle and the strip separating the detectors of the second group extends at a second small angle, which is oriented oppositely to the first angle, relative to a line obtained by projecting the interface of the compound wedge onto the plane of the detection system. Thus, by moving the radiation-sensitive detection system relative to the sub-beams in two mutually perpendicular directions, the centres of the radiation spots can always be positioned symmetrically relative to the associated detectors in the case of a correct focussing.

Figure 2:
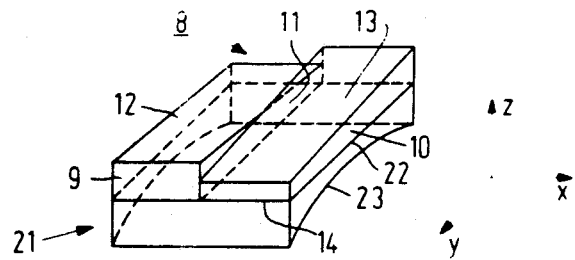
Figure 3:
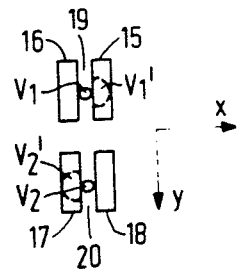
Figure 4:
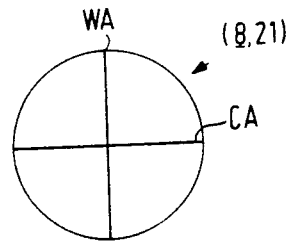
Figure 4:
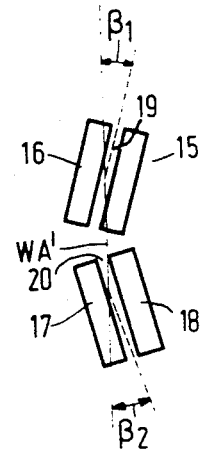
Figure 5:
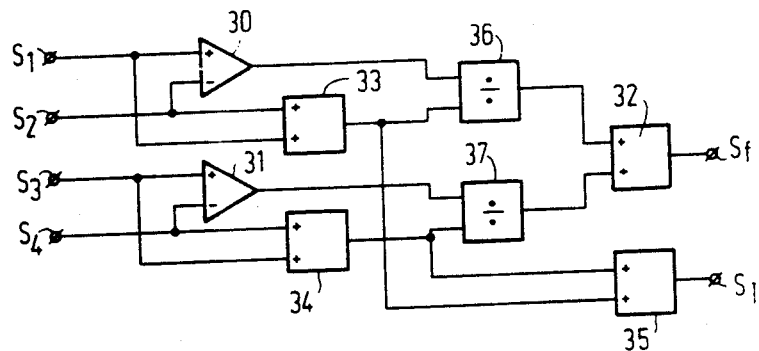

Embodiments of the invention, used in an apparatus for reading an optical record carrier, will now be described in more detail, by way of example, with reference to the accompanying drawings. Wherein:

FIG. 1 shows schematically a read apparatus equipped with a focussing-error detection system in accordance with the invention, FIG. 2 is a perspective view of an example of the beam-splitting element used in said apparatus, FIG. 3 is a plan view of the radiation-sensitive detection system employed in the apparatus, FIG. 4 is a plan view of the beam-splitting element, showing the arrangement of the detectors relative to the interface of the wedge, and FIG. 5 shows a circuit arrangement for processing the detector signals into a focussing-error signal.

FIG. 1 shows a small part of a disc-shaped record carrier 1 in radial cross-section. The radiation-reflecting information structure is situated on the upper side of the record carrier and comprises a multitude of information areas, not shown, arranged along information tracks 2. The information structure is scanned by a read beam b produced by a radiation source 3, for example, a semiconductor-diode laser. A collimator lens 4 converts the diverging beam into a parallel beam of such a cross-section that the pupil of an objective system 5 is filled correctly. This objective system forms a radiation spot V of very small dimensions on the information structure.

The read beam is reflected by the information structure and, as the record carrier moves relative to the read beam, the reflected beam is time-modulated in conformity with the information in the record carrier. In order to separate the modulated beam from the beam emitted by the radiation source, a beam-dividing element, for example a semi-transparent mirror 6, is arranged in the radiation path from the radiation source to the collimator lens 4. This mirror reflects a part of the radiation emitted by the source 3 to the record carrier and transmits a part of the radiation reflected by the record carrier to a radiation-sensitive detection system 7 which converts the modulated read beam into an electric signal. Preferably, this mirror has a reflection coefficient of the order of 0.3 so that, if losses in the radiation path are ignored, substantially 21% of the radiation emitted by the source is incident on the detection system and only 9% returns to the radiation source.

In order to generate a focussing-error signal which provides an indication of the magnitude and the direction of a deviation between the plane of focussing of the objective system and the plane of the information structure, a compound wedge 8 is arranged in the radiation path. An example of such a wedge is shown in perspective and on an enlarged scale in FIG. 2. This wedge comprises two wedge-sections 9 and 10 whose upper surfaces 12 and 13 are inclined in opposite directions relative to the common base surface 14. Alternatively, one of the upper surfaces may extend parallel to the base surface 14 whilst the other upper surface is inclined relative to the base surface. The plane 11 is the interface of the two wedge sections. The optical axis of the imaging system, represented by the dash-dot line a in FIG. 1, is situated in the plane of this interface.

The compound wedge splits the beam b into two sub-beams $b_1$ and $b_2$ which are displaced in opposite directions as a result of the opposite inclinations of the two wedge sections. The sub-beam $b_2$ is focussed at point $F_2$ which is situated, for example, in front of the plane of drawing in FIG. 1. The sub-beam $b_1$ is focussed at point $F_1$ which is situated behind the plane of the drawing. F is the point at which the beam b would be focussed in the absence of the compound wedge. For the sake of clarity the detection system 7 is shown slightly below points $F_1$ and $F_2$. In reality, this system is situated in the plane containing points $F_1$ and $F_2$ and extending transversely of the optical axis.

The detection system 7 comprises four detectors arranged in two groups of two, one group being situated, for example, in front of the plane of drawing in FIG. 1 and the second group behind that plane. FIG. 3 is a plan view of the detection system comprising the detectors 15, 16, 17 and 18. If the beam b is focussed correctly on the plane of the information structure, the radiation spots $V_1$ and $V_2$ formed by the sub-beams $b_1$ and $b_2$, respectively, are situated symmetrically relative to the associated detectors 15, 16 and 17, 18, respectively. In case of a focussing error, each of the radiation spots will be enlarged asymmetrically so that the means of its radiation distribution is shifted relative to the associated detectors. The radiation spots then move in opposite directions.

When the beam b is focussed of a point situated above the plane of the information structure, the radiation spot $V_1$ is shifted towards the detector 15 and the radiation spot $V_2$ towards the detector 17, as indicated by the broken lines $V_1'$ and $V_2'$ in FIG. 3. The detectors 15 and 17 then receive more radiation than the detectors 16 and 18. If the beam b is focussed at a point situated below the plane of the information structure, the situation is reversed and the detectors 16 and 18 receive more radiation than the detectors 15 and 17.

If the output signals of the detectors 15, 16, 17, and 18 are represented by $S_1$, $S_2$, $S_3$ and $S_4$, respectively, the focussing error signal is given by:

$$S_f = (S_1 + S_3) - (S_2 + S_4).$$

By adding the output signals of the four detectors to each other these detectors will function as a single detector by means of which the information signal can be obtained. This information signal is given by:

$$S_i = S_1 + S_2 + S_3 + S_4$$

If the detectors are not positioned correctly, the above focussing error signal $S_f$ may be influenced by contamination of the optical elements in the course of time or by deffects in the plane of the information structure, referred to as "drop-outs". Moreover, the focussing-error signal may be influenced by tracking errors. Therefore, it is preferred to generate a normalized focussing-error signal which is not affected by such events. This focussing-error signal is given by:

$$S_f = \frac{S_1 - S_2}{S_1 + S_2} + \frac{S_3 - S_4}{S_3 + S_4}.$$

This signal is independent of the total radiation intensity in the plane of the radiation-sensitive detection system and is only a function of the radiation distribution among the individual detectors. The signal $S_f$ can be derived from the detection signals by means of known electronic circuits. FIG. 5 shows schematically an example of a signal-processing arrangement. The circuit arrangement comprises two subtractor circuits 30 and 31, four adder circuits 32, 33, 34 and 35, and two divider circuits 36 and 37 and requires no further explanation.

Preferably, a cylindrical lens is arranged in the radiation path behind the semitransparent mirror 6. The semitransparent mirror takes the form of a plane-parallel plate which may render the convergent beam passing through it astigmatic because the plate is arranged obliquely in the convergent beam. A cylindrical lens is also an astigmatic element. By a suitable choice of the relevant parameters of the lens, such as the radius of curvature of the curved lens surface, such a lens is capable of eliminating the astigmatism introduced by the mirror. In FIGS. 1 and 2 the cylindrical lens bears the reference numeral 21. This lens may have a plane surface 22 and a curved surface 23. Alternatively, the lens 21 may have two curved surfaces, provided that it provides a cylindrical-lens action. The axis of the cylindrical lens extends transversely to the optical axis a and, in the present example in which the cylindrical lens is a negative lens, it extends parallel to the plane of the drawing in FIG. 1, thus coinciding with the x-axis in FIGS. 1 and 2. If a positive cylindrical lens were used, the axis of such a lens would coincide with the y-axis.

The cylindrical lens and the compound wedge may be separate elements and may be made of different materials. However, preferably these elements are made of the same material and are combined to form one integrated optical element. In that case, the compound wedge need not be arranged on a separate support and, which is more important, the two elements can be manufactured together so that their alignment relative to each other is automatically correct. The integrated element may be made of a transparent plastic, such as polymethyl methacrylate (PMMA) or polycarbonate (C) and can be manufactured cheaply using known moulding techniques and dies.

The optical behaviour of elements made of such plastics is temperature dependent, but because in the present arrangement the change in refractive index of the material and in the shape of the elements as a result of a temperature variation mainly gives rise to a displacement of the radiation spots $V_1$ and $V_2$ in the longitudinal direction of the separating strips 19 and 20, i.e. in the y-direction in FIG. 2, these changes will not affect the focussing-error signal.

Instead of the rectangular shape shown in FIG. 2, the integrated element (8, 21) may be circular shape. In plan view, this element is then as shown in the upper part of FIG. 4. In this Figure, CA is the cylinder axis and WA the wedge axis, i.e. the line of intersection of the interface 11 of the wedge with the upper surface 22 of the cylindrical lens. The lower part of FIG. 4 shows how the detectors are preferably oriented relative to the wedge axis. WA' is the projection of the wedge axis in the plane of the detectors. The longitudinal directions of the separating strips 19 and 20 make a small angle $\beta_1$ and $\beta_2$, respectively, of the order of 10° with the line WA'. If the connecting line between the radiation spots $V_1$ and $V_2$ is offset relative to the separating strips 19 and 20, it is now possible to position the radiation spots in the case of correct focussing symmetrically relative to the detectors 15, 16 and 17, 18, respectively, during assembly of the focussing-error detection system by shifting the radiation spots and the substrate carrying the detectors relative to each other in two mutually perpendicular directions.

For the actual focussing-error detection, the orientation of the wedge interface 11 is irrelevant. It is important only that the plane of the interface contains the optical axis a. When the focussing-error detection system is employed in an apparatus for reading an optical record carrier, this interface preferably extends effectively parallel to the track direction, i.e. this interface should extend perpendicularly to the plane of drawing in FIG. 1 or parallel to the y-direction in FIG. 2. The detectors 15, 16, 17 and 18 may then be used for generating a tracking signal which provides an indication of the degree of coincidence of the center of the read spot V with the track center. The tracking signal $S_r$ is given by $$S_r = (S_1 + S_4) - (S_2 + S_3).$$

The invention has been described for a system used in an optical read unit, but the invention may also be used in a write unit or in a combined read/write unit. The write unit is of a construction similar to the construction of the read unit described herein. For recording information, for example, by melting pits into a metal layer, more power is required than for reading and, moreover, the write beam should be time-modulated in conformity with the information to be recorded. The radiation source in the write unit may be a gas laser, such as a HeNe laser, and a modulator such as an electro-optical or an acousto-optical modulator should be arranged in the path of the write beam. Alternatively, a diode laser may be used, in which case the write beam is modulated by varying the electric current in the diode laser, so that no separate modulator is needed.

The focussing-error detection system described does not utilize any special properties of the optical information structure or surface on which the beam must be focussed. It is merely necessary that this surface is radiation-reflecting. Therefore, the focussing-error detection system may be used in various application where very accurate focussing is required, for example in microscopes.

What is claimed is:

1. Apparatus for detecting, in an optical imaging system, a deviation between a radiation reflecting surface and a focusing plane of an objective system, said apparatus comprising means, arranged in the path of radiation which has been reflected by said reflecting surface, for splitting said reflected radiation into a first sub-beam and a second sub-beam and a radiation sensitive detection system arranged in the path of said sub-beams, said detection system comprising a plurality of detectors each converting radiation incident thereon into an electrical signal, said detectors being arranged into a first group associated with said first sub-beam and a second group associated with said second sub-beam, and means coupled to said detectors for deriving a focusing error signal from said electrical signals, said radiation splitting means including a beam splitter comprising two adjacent wedge sections having a common base surface and a planar interface disposed in a plane which is substantially perpendicular to said base surface and which contains an optical axis of the imaging system, said wedge sections each having a sloping surface disposed opposite said base surface, said sloping surfaces each lying in a plane which is substantially perpendicular to said interface plane and being inclined relative to each other.

2. The apparatus according to claim 1 including means for separating radiation reflected by the reflecting surface from radiation traveling towards said reflecting surface and for directing said reflected radiation towards said radiation splitting means.

3. The apparatus according to claim 2 wherein said separating means includes a semitransparent mirror and comprising a cylindrical lens arranged in the path of said reflected radiation, said beam splitter being disposed on one surface of said cylindrical lens.

4. The apparatus according to claim 8 wherein said beam splitter and said cylindrical lens are made of the same material and form an integral optical element.

5. The apparatus according to claim 1, 2 or 3 wherein each of said first and second groups is comprised of at least two detectors, the detectors of each group being spaced from each other by a separating strip, said strip of said first group extending at a first small angle relative to a line formed by the projection of said interface onto said plane in which said detectors are disposed, and said strip separating said detectors of said second group extending at a second small angle relative to said line with said first and second angles having opposite orientations.

6. The apparatus according to claim 1, 2 or 3 wherein said sloping surfaces of said wedge sections are inclined in opposite directions relative to each other.

7. The apparatus according to claim 1, 2 or 3 wherein each of said first and second groups is comprised of at least two detectors, the detectors of each group being spaced from each other so as to form an elongated separating strip therebetween, said beam splitter being arranged with respect to said detectors so that each of said sub-beams is centered on a respective one of said strips when said focusing plane is substantially coincident with said reflecting surface.

8. The apparatus according to claim 7 wherein said beam splitter is configured so that temperature changes cause the respective sub-beams to move generally along the lengths of the associated strip so as to reduce effects of temperature changes on said focusing error signal.

9. The apparatus according to claims 1, 2 or 3 wherein said detectors are arranged so that one of said groups is disposed on one side and the other of said groups is disposed on the other side of a plane which comprises said optical axis and which is substantially perpendicular to said interface plane.

10. An apparatus for reading and/or recording information arranged in tracks on a reflective surface of a record carrier, said apparatus comprising means for producing a beam of radiation, means for focusing said beam to a spot on said reflecting surface, means for separating the radiation which is reflected by said reflecting surface from radiation traveling towards said reflecting surface and directing said reflected radiation along an optical axis in a first path which is different from the path traversed by radiation traveling towards said record carrier, a beam splitting element arranged in said first path for splitting said reflected radiation into a first and second sub-beam, and a radiation sensitive detection system arranged in the path of said first and second sub-beams, said beam splitting element comprising two adjacent wedge sections having a common, planar, base surface and a planar interface disposed in a plane which is substantially perpendicular to said base surface and contains said optical axis, said wedge sections each having a sloping surface disposed opposite said base surface, said sloping surfaces each lying in a plane which is substantially perpendicular to said interface plane and being inclined relative to each other, said detection system comprising a first and a second group of radiation sensitive detectors for converting radiation incident thereon into corresponding electrical signals, said detectors being disposed in a plane which is perpendicular to said interface plane with each group of detectors being associated with a respective one of said sub-beams, and means for generating a focus error signal from said electrical signals.

11. The apparatus according to claim 10 wherein said focusing means includes an objective system arranged so that at least a part of said reflected radiation is reflected back to said objective system and is directed thereby along said optical axis.

12. The apparatus according to claim 10 or 11 wherein said radiation separating means includes a semitransparent mirror and comprising a cylindrical lens arranged in the path of said reflected radiation, said beam splitting element being disposed on one surface of said cylindrical lens.

13. An apparatus for reading and/or recording information arranged in tracks on a reflective surface of a record carrier, said apparatus comprising means for producing a beam of radiation, means for focusing said beam to a spot on said reflecting surface, a beam splitting element for splitting the radiation reflected by said reflecting surface into a pair of sub-beams and a detection system having a first and second pair of detectors, each detector being adapted to convert radiation incident thereon into an electrical signal and the detectors of each pair being spaced from each other so as to form an elongated separation strip therebetween, said detectors being arranged with respect to said beam splitting means so that each of said sub-beams is incident on a respective one of said first and second pair of detectors with the intensity of the radiation incident on at least one of said detectors having a first value when said beam is focused properly on said reflecting surface and a second value when said beam is not properly focused on said reflecting surface, and means coupled to said detectors for deriving a focusing error signal from said electrical signals, said beam splitting element being configured so that temperature changes thereof cause the radiation of the respective sub-beam to move along the associated separating strip in the longitudinal direction thereof so as to reduce the effects of temperature changes on said focusing error signal.

14. The apparatus according to claim 13 comprising means for separating the radiation which is reflected by said reflecting surface from radiation traveling towards said reflecting surface and directing said reflected radiation along an optical axis in a first path which is different from the path traversed by the radiation traveling towards said reflecting surface, and wherein said beam splitting element is arranged in said first path.

15. The apparatus according to claim 13 or 14, wherein said beam splitting element comprises two adjacent wedge sections having a common base surface and an interface disposed in a plane which is substantially perpendicular to said base surface and contains said optical axis, said wedge sections each having a sloping surface disposed opposite said base surface, said sloping surfaces each lying in a plane which is substantially perpendicular to said interface plane and being inclined relative to each other.

16. The apparatus according to claim 13, wherein said beam splitting element and said detectors are arranged so that, when said beam is properly focused on said reflecting surface, said at least one said sub-beam is centered on said separating strip of the associated pair of detectors and said at least one sub-beam moves in a direction transverse to the longitudinal direction of said strips in the event that said beam is focused in a plane which is displaced from said reflecting surface.

17. The apparatus according to claim 15 wherein said interface extends in a direction effectively parallel to the track direction.

* * * * *